H. H. WELCH.
ELECTRICAL RECORDER.
APPLICATION FILED JUNE 16, 1919.

1,404,332.

Patented Jan. 24, 1922.

INVENTOR
Horace H. Welch
BY
Walter M. Fuller
ATTORNEY

UNITED STATES PATENT OFFICE.

HORACE H. WELCH, OF MILWAUKEE, WISCONSIN.

ELECTRICAL RECORDER.

1,404,332.  Specification of Letters Patent.  Patented Jan. 24, 1922.

Application filed June 16, 1919. Serial No. 304,677.

*To all whom it may concern:*

Be it known that I, HORACE H. WELCH, a citizen of the United States, residing at Milwaukee, in the county of Milwaukee and State of Wisconsin, have invented certain new and useful Improvements in Electrical Recorders, of which the following is a specification.

My invention concerns various features of novelty and improvement in electric recorders and aims to provide a simple structure capable of taking readings at intervals and recording the same. To this end the device is constructed, at definite timed intervals, to measure the position of the movable element, such as an index or pointer whose location is determined by and varies with a variable or changeable condition, such, for example, as the steam-boiler pressure. These readings or measurements are individually recorded and are also integrated so that by properly calibrating or graduating the integration scale, at the end of a predetermined time period, the reading of the index on the scale will show the average of all of the readings or measurements taken during such period.

In order that those skilled in this art may have a full and complete understanding of this invention and its various advantages, I have illustrated two embodiments of the same in the accompanying drawings, the illustrations in such drawing to be interpreted in view of the following detailed description.

Figure 1:
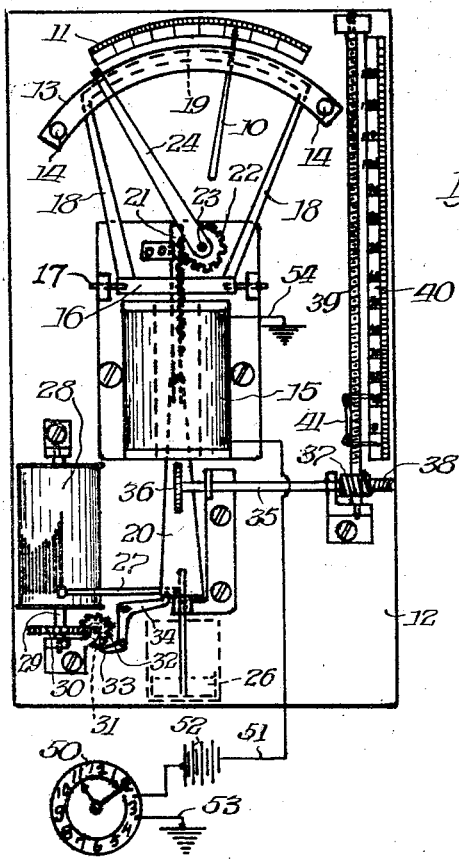
Figure 1 illustrates one embodiment of the invention, some of the features being shown diagrammatically.
Figure 2:
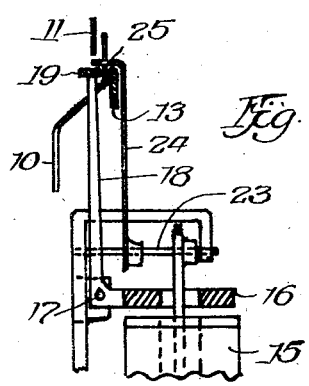
Figure 2 is a fragmentary cross-section showing the construction and relation of certain of the parts.

Referring to this drawing, it will be seen that the instrument or apparatus of Figures 1 and 2 comprises a pivoted, bent pointer or index 10 which is connected to and operated by any variable condition appliance such as a pressure-gauge, thermometer, or similar device (not shown), such index co-operating with an underlying, properly-graduated, stationary, curved or arcuate scale 11 mounted on a suitable panel or support 12. Thus, this pointer will, unless otherwise prevented, always indicate the present condition of the variable function, such for example, as the steam-pressure of a boiler.

In front of and adjacent to the end portion of the index or finger is a stationary, flat, curved bar or plate 13 supported at its ends on the panel 12 by studs or posts 14, 14. The apparatus includes additionally a solenoid or electro-magnet 15 mounted on the part 12 provided with an armature 16, adjacent to its upper pole, pivoted or hinged on a bracket at 17, such armature carrying a pair of diverging, upwardly-extended, arms 18, 18 equipped or connected together at their upper ends with a curved clamp-bar 19 in register or alignment with the fixed bar or plate 13. It will be understood from this construction that whenever the solenoid or magnet is energized, the attraction of the armature thereto will swing the bar 19 forwardly causing a clamping or gripping of the pointer or index 10 between itself and the stationary plate 13. Thus, the pointer will be temporarily held firmly against movement so long as the magnet remains active.

This solenoid is also provided with a tapered core 20 carrying an upwardly-projecting rack 21, the teeth of which are in mesh with those of a pinion 22 on the shaft 23 of a measuring-arm 24, the pivotal point of which is concentric with that of the pointer 10. At its upper part, arm 24 has a rearwardly-bent end portion 25 in the path of travel or oscillation of index 10.

The movements of the solenoid core and its rack may be retarded, if desired, by a dash-pot appliance 26 or other suitable restraining device. The core has fixed thereto and consequently movable therewith, a laterally-extended marker-rod 27 carrying at its end a suitable marker co-acting with a revoluble paper-covered record-drum 28, the shaft 29 of which has a worm-wheel 30 actuated by a worm 31 fitted with a ratchet 32 operated by a pawl 33 on a pivoted bell-crank 34, one arm of which is in the lower range of travel of the core 20.

The integrating mechanism includes a suitably-journaled shaft 35 fitted with a soft-iron roller 36 at one end which is normally slightly out of contact with the core 20, but is drawn into contact with and actuated by such core when the magnet or solenoid is energized. Shaft 35, by means of a worm 37 thereon, turns a worm-wheel 38 on a properly-supported, revoluble, vertical screw-threaded shaft 39 near a graduated scale 40 with which a spring index 41 on the shaft co-acts. Turning of the shaft, by reason of its screw-thread, causes the index-clip to travel up, but it may be readily replaced or reset to zero position by pressing its two terminal portions toward one another, thereby temporarily releasing them from the thread of the shaft.

In order to energize the magnet at stated intervals for definite short periods, clock 50 is employed, with electric contacts which are automatically closed or brought together, say every minute, for three or four seconds. Such clock is in circuit 51 connected to one terminal of the magnet and containing an electric-battery 52, the clock and magnet being grounded respectively at 53 and 54.

The appliance operates as follows:

The position of the needle 10 varies as the condition or function which it measures or indicates on scale 11 fluctuates. The normal position of arm 24 corresponds to zero position on the scale 11, and hence it in no way interferes with the free and unrestrained operation or movement of the index. When the clock closes the circuit, the magnet becomes energized and attracts both the armature, thereby temporarily clamping the index 10 in its then position, and the core 20 which begins to ascend. The core can travel upwardly until the arm 24, which it actuates, engages the clamped index, which, of course, precludes further movement of the arm or core, even though the magnet remains energized for a longer period. It will be seen, therefore, that the extent of travel of the core corresponds in amount to the distance the index is from zero position at the left-hand end of scale 11. If, accordingly, we mark the movement of the core on a paper, we have a permanent record of the position of the index at that time. This is done by a marker on arm 27 drawing a vertical line on the paper-sheet of drum 28, the length of which line will be proportional to the value which the pointer 10 indicates on the scale. The upper ends of such series of individual lines, one for each reading or measurement, as shown in Figure 1, illustrates the fluctuations or variations in the changing condition with which the index is associated.

The upward travel of the core is also registered and integrated by the index 41. As soon as the magnet is energized, the roller 36 is pulled against the core and consequently the upward travel of the latter is communicated through such roller to the screw-shaft 39, which causes the movement of its index. Accordingly, the position of such index at any time shows the integration or addition of all of the upward movements of the core, or, in other words, all of the individual readings of needle 10 subsequent to the index 41 having been previously reset to zero position. As soon as the clock breaks the circuit, the maget is at once de-energized and the core descends to normal or lowermost position, such movement, of course, restoring arm 24 and marker-arm 27 to normal or zero position. There is no retrograde movement of roller 32, because as soon as the magnet is de-energized, the attraction of the core therefor ceases, and the roller consequently does not partake of the descending travel of the core.

As the core, during its fall, approaches its lowermost position, it strikes the end of bell-crank 34, rocking the same sufficiently to actuate ratchet-wheel 32 through the instrumentality of pawl 33. This steps the drum 28 around a slight amount so that when the core rises the next time the marker will trace another vertical line a slight distance removed from the one previously made.

As indicated above, these various readings are taken at definite spaced time intervals as determined by the construction of the clock, and the scale 40 may be so graduated as to give an average reading at the end of a definite time period, for example, 24 hours.

Figure 3:
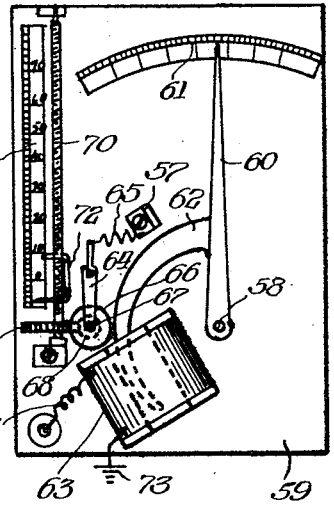
Figure 3 illustrates another embodiment of the invention.

In Figure 3 a somewhat different structure is disclosed. This includes a pivoted needle or index 60, corresponding to pointer 10, cooperating with a scale 41 and actuated to indicate thereon any varying condition, such as pressure, by means associated with the shaft 58 on which the index is mounted, all of the parts of the mechanism being preferably carried on a panel or support 59. The zero graduation on scale 61 is at the left-hand end and when the index 60 points to such zero graduation, it will be in engagement with a stop or abutment 57. Consequently, the pointer or finger 60 cannot turn to the left beyond the zero graduation of its scale. Such index carries a laterally-extended, arcuate, tapered core 62 co-operating with an electro-magnet or solenoid 63 and adjacent to such core is an iron-roller 66 on a shaft 67 on a lever 64 equipped with a spring 65 tending to move the roller slightly out of contact with the curved edge of the core. The shaft 67 also has a worm 68 thereon in mesh with a worm-wheel 69 on a screw-threaded shaft 70 parallel to an integration-scale 71 with which an index 72 on the shaft co-operates. The magnet 63 is grounded at 73 and its terminal 74 is connected to the clock and battery circuit as in the other instance.

Under normal conditions when the clock circuit is open, the index or pointer 60 is free to swing over the scale 61 and to indicate thereon the varying or fluctuating condition with which it is operatively associated. When the clock closes the circuit, however, and the magnet becomes energized, by reason of the action of the latter on the core 62, the needle is caused to swing to the left until it engages the stop or abutment 57 which prevents further movement in that direction. As soon as the magnet is energized, the roller 67 is attracted to the core and rides on its curved edge so that the index 72 is moved an amount proportional to the movement of the index 60 in traveling back to zero position. It will be readily understood, therefore, that the index 72 integrates these various individual readings or measurements. As soon as the clock opens the circuit the roller 66 is no longer attracted to the core and the needle or pointer 60 is then free to respond to the action of the varying condition with which it is connected and to indicate the then value on scale 61.

It will be appreciated that in the appliance of Figure 1, an arm moves up to the clamped index to measure its distance away from zero position, whereas, in the appliance of Figure 3, the pointer or index itself is restored to zero position and its movement measured and recorded.

Although I have presented in this application only two embodiments of the invention, it is to be understood that the invention is susceptible of a variety of embodiments varying more or less in detail. The invention is, therefore, not limited and restricted to the precise and exact features of construction shown and described because these may be varied within wide limits without departure from the substance and essence of the invention and without the sacrifice of any of its substantial benefits and advantages.

I claim:

1. In a recording-appliance of the character described, the combination of an element movable by a variable condition, a measuring member, means actuated at intervals to temporarily lock said element against movement, means to move said measuring member at intervals from a base position to the locked position of the movable element, and means to record such individual measuring movements of said members, substantially as described.

2. In a recording-appliance of the character described, the combination of an element movable by a variable condition, a measuring member, means actuated at intervals to temporarily lock said element against movement, means to move said measuring member at intervals from a base position to the locked position of the movable element, and means to record the integration of such individual measuring movements of said member, substantially as described.

3. In a recording-appliance of the character described, the combination of an element movable by a variable condition, a measuring member, means actuated at intervals to temporarily lock said element against movement, means to move said measuring member at intervals from a base position to the locked position of the movable element, means to record such individual measuring movements of said member, and means to record the integration of such individual measuring movements, substantially as described.

4. In a recording-appliance of the character described, the combination of an element movable by a variable condition, a measuring member, electro-magnetic means actuated at intervals to temporarily lock said element against movement, electro-magnetic means to move said measuring member at intervals from a base position to the locked position of the movable element, electro-magnetic means to record such individual measuring movements of said member, and electro-magnetic means to record the integration of such individual measuring movements, substantially as described.

5. In an appliance of the character described, the combination of a movable element the position of which is determined by a variable condition, a measuring member, an electro-magnet, means actuated by said magnet to lock said element at intervals temporarily against movement, means actuated by said magnet to move said measuring member at intervals from a base position to the locked position of the movable element, and means actuated by said magnet to record such measuring movements of said member, substantially as described.

HORACE H. WELCH.